United States Patent Office 3,385,539
Patented May 28, 1968

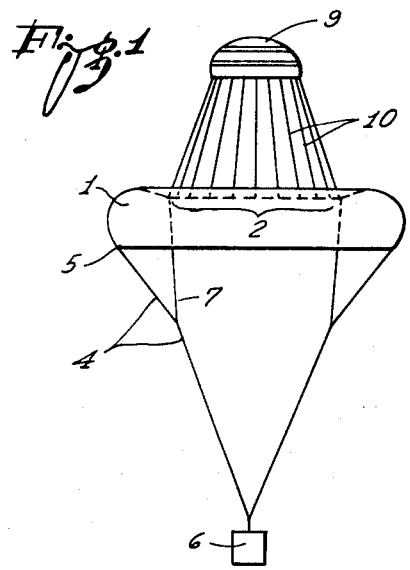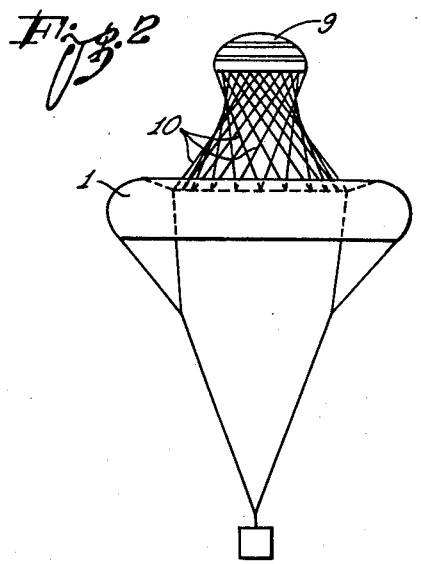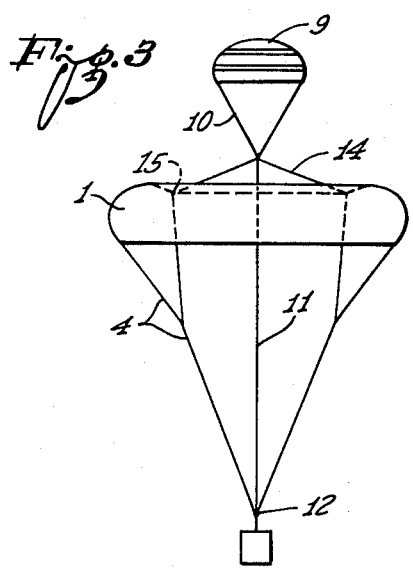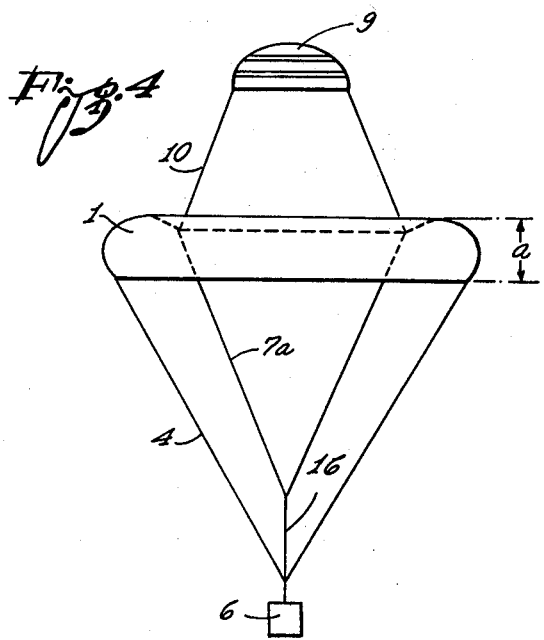
INVENTORS:
Edgar G. Ewing
Jack R. Vickers
Wesley R. Stoeltzing
By William W. Rundle
AGENT May 28, 1968  E. G. EWING ET AL  3,385,539
PARACHUTE ASSEMBLY FOR AERIAL RECOVERY
Filed Aug. 5, 1966  4 Sheets-Sheet 2
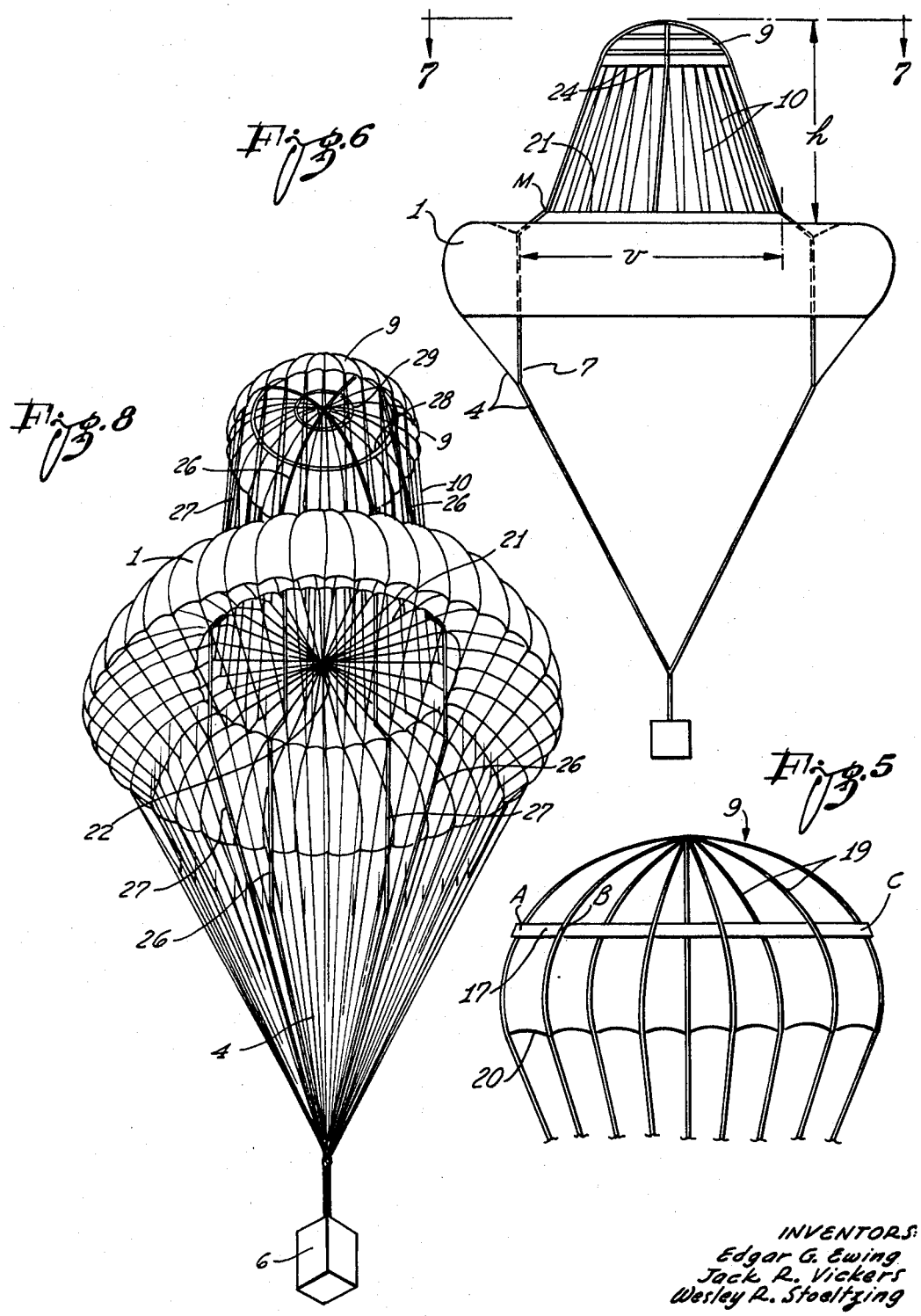
INVENTORS:
Edgar G. Ewing
Jack R. Vickers
Wesley R. Stoeltzing
By William W. Rundle
AGENT

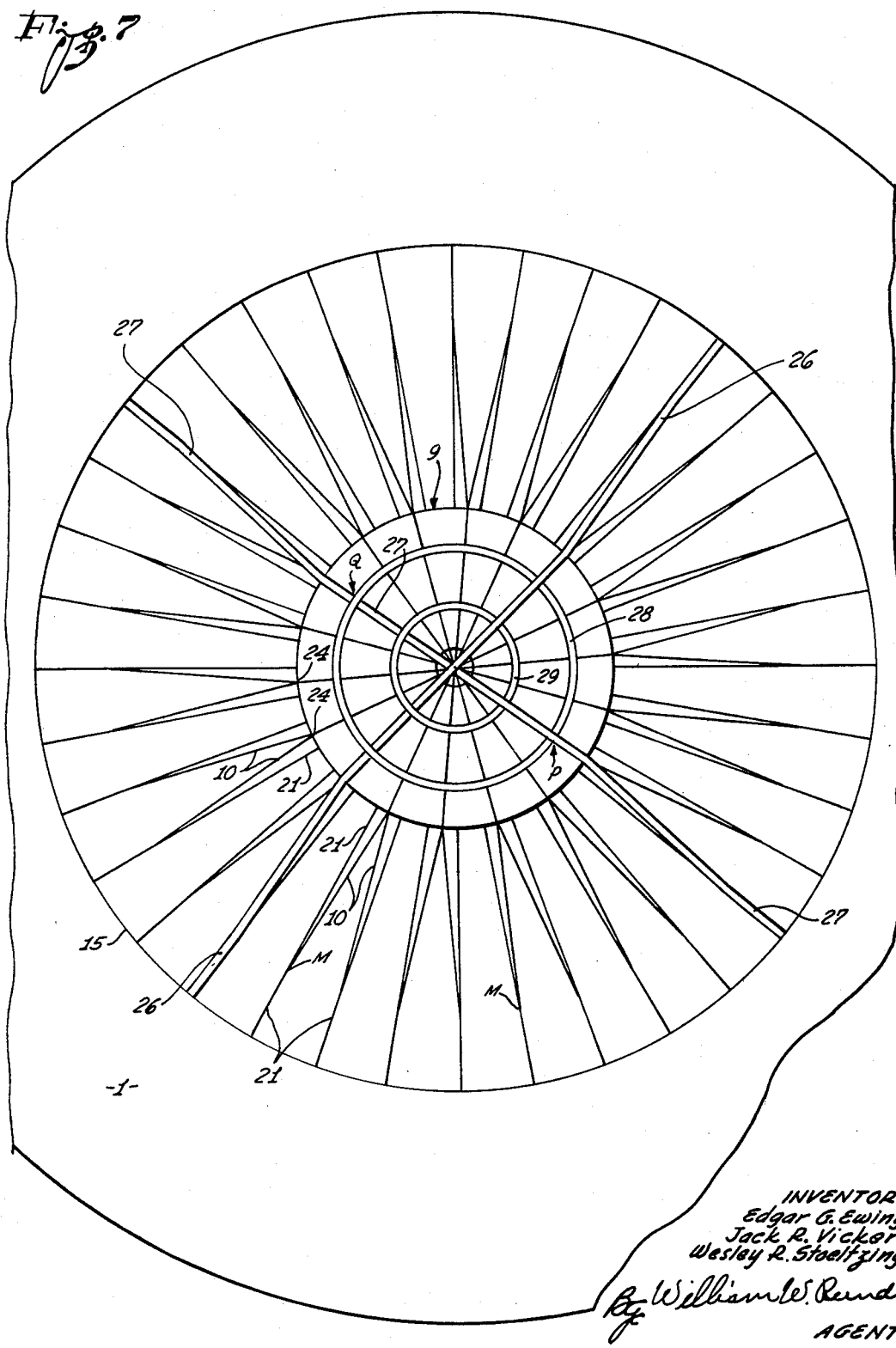

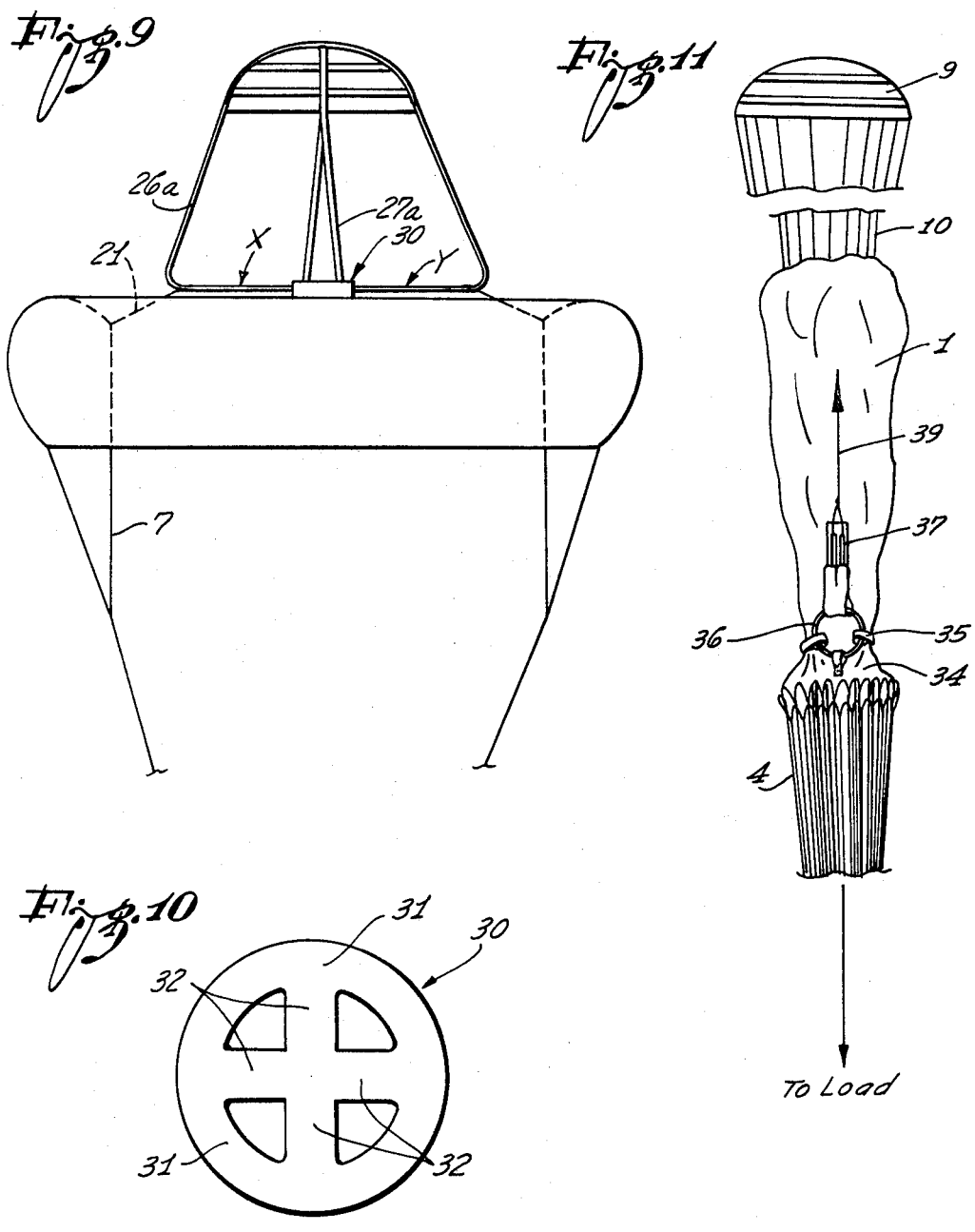

3,385,539
PARACHUTE ASSEMBLY FOR AERIAL RECOVERY
Edgar G. Ewing, Thousand Oaks, Jack R. Vickers, Granada Hills, and Wesley R. Stoeltzing, Northridge, Calif., assignors to Northrop Corporation, Beverly Hills, Calif., a corporation of California
Filed Aug. 5, 1966, Ser. No. 570,554
9 Claims. (Cl. 244—142)

ABSTRACT OF THE DISCLOSURE

A combination of annular ring type parachute and a smaller target parachute close-coupled to the annular parachute above the large central opening. The target parachute is stabilized in the airstream flowing through the annular parachute by suspension line arrangements which always assure positive inflation of the target parachute. For the larger sized openings of annular parachutes (roughly 50% to 80% of total parachute diameter), cross-vent lines should be furnished. Special load-bearing suspension lines and other apparatus are incorporated to withstand aerial pick-up forces.

The present invention relates to parachutes, and more particularly, to special type parachute assemblies usable for the purpose of aerial recovery of descending objects.

In aerial recovery operation, a descending parachute of proper configuration is intercepted by a specially equipped aircraft, the parachute being engaged, accelerated and brought into tow for recovery of the assembly and its attached load aboard the aircraft.

In presently used systems of this type where a target parachute and a main parachute are employed, the target parachute must be maintained at a distance above the main parachute equal to about three or four times the projected diameter of the main parachute, to provide an air supply for proper inflation of the target parachute. Thus, for a 50 foot projected diameter main parachute, for example, the target parachute must be from about 150 to 200 feet above. The small target parachute is therefore hard to see, and because of its tendency to "cone" or gyrate around in a circle instead of standing straight and steady, it is especially hard to engage by the pick-up aircraft. The weight of the long interconnecting line to the target parachute is also a disadvantage, since it must be sufficiently strong to sustain the pick-up load.

An object of the present invention is to provide an improved parachute assembly for aerial recovery operations, which assembly enables both easier interception thereof by the crew of the pick-up aircraft than was heretofore possible, and more reliable engagement of the pick-up equipment into the target parachute once the interception contact is made.

It is a more specific object of this invention to provide an aerial recovery parachute assembly wherein the target parachute can be successfully coupled to the main parachute much more closely than in known prior art devices, with a resultant saving in structural weight and increased stability of the target parachute. Other objects and advantages will be noted in the subsequent detailed description.

Briefly, our invention comprises the combination of an annular ring type main parachute having a relatively large central opening therein, a smaller, target, parachute positioned relatively close above the main parachute in the airstream flowing through the main parachute opening, and support means connected between said target parachute and the load to be carried by the combination, the support means being specially adapted to accommodate pick-up and retrieval forces.

Our invention will be more fully understood by reference to the following description of specific embodiments and to the accompanying illustrative drawings, wherein:

FIGURE 1 is a diagrammatic elevation view of one parachute assembly showing our invention.

FIGURES 2, 3, 4 and 6 are views similar to FIGURE 1, showing modified forms of the invention.

FIGURE 5 is a diagrammatic elevation view of the target parachute of FIGURES 1 through 4, showing construction detail.

FIGURE 7 is a plan view of the parachute embodiment of FIGURE 6, showing the location of special load-bearing lines.

FIGURE 8 is a perspective view of the embodiment of FIGURE 6, showing more clearly the appearance of the entire assembly.

FIGURE 9 is a diagrammatic elevation view showing an alternate connecting structure between the target parachute and main parachute.

FIGURE 10 is a plan view of a central load member used in the structure of FIGURE 9.

FIGURE 11 is a diagrammatic elevation view of the present parachute system showing the target parachute functioning as a drogue during the reefing interval, and with the mouth of the annular parachute tightly closed by a reefing band.

Referring to the drawings for a more detailed description of our invention, FIGURE 1 shows an annular ring parachute 1 having a large central opening 2 referred to herein as a vent, although it is not a vent in the same sense as generally used in the parachute art. This vent 2 can be from about 40% to 80% of the total parachute diameter, for example. Exterior suspension lines 4 lead from the parachute skirt 5 downward to a load 6, and are fastened thereto in any suitable conventional manner. Interior suspension lines 7 are also provided from the periphery of vent 2 to respective junctions with the exterior lines 4.

In this embodiment shown in FIGURE 1, a target or pick-up parachute 9 is provided with target suspension lines 10 from its skirt to the periphery of the vent 2. The number of target suspension lines 10 may be less than the number of interior suspension lines 7, and the target lines 10 are preferably securely attached to the upper ends of the interior lines 7 in any convenient manner. The target parachute 9 is inflated and kept inflated by air flowing through vent 2, and can therefore be close-coupled to the main annular parachute 1. The minimum length of the target lines 10 is typically about 15 feet, for example.

Another embodiment is shown in FIGURE 2. Here, the annular parachute 1 and the target parachute 9 remain the same, but the target lines 10 are installed in a geodetic type pattern, i.e., bidirectionally from each point, if increased constraint is desired or necessary to make the target parachute occupy a more rigid position relative to the main parachute.

FIGURE 3 shows another alternate design, where the target parachute 9 has conventional suspension lines 10 connected to a single target riser 11 which is connected at its lower end directly to the confluence 12 of the main parachute lines 4. The target parachute 9 in this case is attached to the main annular parachute 1 with a few (four for example) centering lines 14 extending to the vent band 15.

In FIGURE 4, the target lines 10 are connected as in FIGURE 1, but the interior vent suspension lines 7a are joined to a common vent riser 16 which leads to the load 6. Vent riser 16 may be adjustable in flight, to vary the vent-to-skirt dimension a. This is for the purpose of obtaining the desired opening characteristics, stability, and drag efficiency.

In all of the arrangements shown in FIGURES 1 through 4, the target parachute 9 may have one or more (preferably two) high-strength horizontal bands 17 (FIGURE 5) interlaced between the conventional radial tapes or lines 19. Band 17 should be loosely stitched to the radials 19 as at points A, B, C, etc., to break loose when engaged by a hook device of a pick-up aircraft. It is seen that when such hook intercepts a band 17, the band will be forced into a straightened out loop securely engaged with the radials 19 at the top of the target parachute 9. In this manner, all the radials 19 are being used to resist the retrieval forces, and the sum of their individual tensile load capacities is made ample to support and retrieve the entire assembly and load 6.

Only the skirt edge 20 of the canopy of target parachute 9 is shown in FIGURE 5, for simplicity. The target parachute 9 may have a solid or slotted canopy, the latter construction being known as a ring-slot parachute.

An especially successful arrangement is shown in FIGURE 6, and in further detail in FIGURES 7 and 8. In this embodiment, the annular parachute 1 may have 36, for example, suspension lines 4 and interior lines 7 attached to the canopy. Further, at the intersections of these interior lines 7 with the parachute, a plurality (18 in this instance) of horizontal cross-vent lines 21 is connected diametrically across the vent 2. They all are preferably attached together at a central crossing point 22.

A target parachute 9 is provided as in the other embodiments, and it will have only 18, for example, suspension line connecting points 24 since it is much smaller than the main parachute. From each of these latter points 24, two target suspension lines 10 are connected, the lower ends of which lines are respectively connected, as by stitching, to two adjacent cross vent lines 21 at a certain distance inward from the vent band 15, as shown at points M in FIGURES 6 and 7. The relative number of various lines is, however, a matter of choice based on size, good design and convenient geometry.

As a general rule, we have found that in the present systems, no cross-vent lines are needed for a 50% vent opening or smaller. In systems having approximately an 80% vent opening, however, the center-connected cross-vent lines 21 are desirable to cause the annular parachute 1 to quickly assume a circular deployed shape. This avoids situations where the annular parachute takes on an oblong or other irregular shape and exhibits periodic changes of shape during steady descent.

To provide the required strength for aerial pick-up by an airplane, this parachute assembly is provided with two extra heavy radial reinforcements 26 and 27 located at 90° to each other, as shown in FIGURES 7 and 8 and by the heavy lines in FIGURE 6. Each radial reinforcement 26 or 27 extends preferably in one continuous length up from the load 6, where it forms one of the main suspension lines 4 and one of the interior lines 7, inward as a portion of one of the cross-vent lines 21, upward as one of the target lines 10, radially around the target parachute 9 across the top thereof, and similarly around and down the opposite side back to the load 6.

Two extra-heavy lateral reinforcements 28 and 29 are also provided, as shown in FIGURE 7, in the slotted type target parachute 9. The lateral reinforcements 28 and 29 are relatively loosely fastened to the radial reinforcements 26 and 27 at their crossing points, to assure that such positions will remain attached during parachute opening operations, but will pull apart when the retrieving hook device from the pick-up airplane passes through the target parachute 9. It will be noted that one lateral reinforcement 28 lies under the radial reinforcement 27 at point P and over it at point Q, for example, while the same "under and over" positioning is followed regarding the other radial reinforcement 26, and likewise for the other lateral reinforcement 29 relative to both radial reinforcements 26 and 27. Thus, a successful retrieval will be made, with at least one of the reinforcements 26, 27, 28 and 29 sustaining all of the applied tension loads. The target parachute 9 may be damaged beyond repair, but the annular parachute 1 will be usable again.

Still another effective and probably more efficient embodiment is indicated in FIGURE 9. Here, two similar radial reinforcements 26a and 27a are provided in the target parachute 9, but extend down only to the cross-vent lines 21, where they lead radially inward to the center point, where a load ring 30 (FIGURE 10) is installed. The radial reinforcements 26a and 27a in this arrangement have a relatively weak attachment, as described hereinbefore, to the associated cross-vent lines 21 along areas X and Y. At ring 30, the cross-vent lines 21 are solidly connected to the ring rim 31, while the ends of radial reinforcements 26a and 27a are solidly connected to the respective four spokes 32, as by looping around these spokes. For this embodiment, the pick-up load is distributed evenly among the cross-vent lines 21 and to the interior main suspension lines 7, with the ring 30 forming a central load-sustaining member. Obviously, other such ring designs may occur to persons skilled in this art.

One of the major advantages of the present invention is the convenient dual role of the target parachute as a drogue during initial deployment of the assembly and as a pick-up target. To explain further, the entire assembly can be launched or released from a returning space vehicle, for example, with the main annular parachute in a reefed condition when the target parachute becomes inflated. This is illustrated in FIGURE 11. The skirt mouth 34 of the annular parachute 1 is tightly closed by a reefing band 35, held in place by a retaining loop 36. Reefing cutters 37 are provided for the loop 36, such cutters being of a suitable time-delay type as is well known.

During and/or immediately following launching of the parachute assembly, a cutter actuating cord 39 is pulled out to initiate the time delay period of the particular reefing cutters used, and the target parachute 9 is inflated, thus appearing as shown in FIG. 11 during the reefed interval. At the end of the given delay time, cutters 37 operate to sever the retaining loop 36, allowing the reefing band 35 to separate for inflation of the main annular parachute 1. After full deployment, the present assembly, in any of its described forms, is obviously ready for aerial pick-up or for a conventional landing.

It is thus seen that a greatly superior aerial recovery parachute system is enabled by the present invention. The target parachute may be destroyed by an unsuccessful pickup attempt without jeopardizing the safe landing functions of the main parachute. The inflated target parachute is out of the wake of the main parachute, and thus may be close-coupled without endangering reliable inflation. When deployed, the target parachute may be used initially as a drogue parachute to decelerate the load to a slower velocity for main parachute opening after a short reefed interval, as previously described. The weight of the long heavy cable from the target parachute to the main parachute in conventional systems is substantially eliminated.

In particular, it is pointed out that if for any reason the target parachute should collapse or fall over, the dimensions and/or geometry of the target suspension lines are such as to keep the target parachute over the annular parachute vent, so that it positively will re-inflate for the pick-up operation. In other words, taking the illustration of FIGURE 6, the height $h$ of target parachute 9 over annular parachute 1 is substantially less than the remaining vent opening distance $v$.

Further, it will be seen that a significant improvement in drag efficiency is obtained over previous aerial pick-up systems due to the use of the present annular parachute. The drag efficiency is expressed as $C_D S/W_p$, where $C_D$ is the coefficient of drag, $S$ is the surface area, and $W_p$ is the weight of the parachute. With present designs, the figure for drag efficiency ranges between about 25.5 and 46.5 ft.²/lb., the drag efficiency improving with increased relative vent size.

It is also readily seen that a great variety of configurations and proportions are possible with this invention, to match intended applications. These variations include, but are not limited to, relative vent diameter, vent extension (relative vertical distance between canopy skirt and vent), target parachute trailing distance, target parachute attachment means, and construction features of both parachutes. The vent extension previously referred to can be altered by changing the lengths of the interior lines 7, which is not possible with the ordinary circular parachute having no interior lines.

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

We claim:

1. A parachute assembly comprising the combination of:
   (1) an annular ring type main parachute having a large central vent opening therein, said opening having a diameter of at least 40% of the overall projected diameter of said annular parachute;
   (2) a smaller, target parachute positioned relatively close, but at least approximately twelve feet above said main annular parachute in the airstream flowing through said vent opening;
   (3) target suspension lines connected from said target parachute to said annular parachute, said target suspension lines being so configured in length and geometry that said target parachute cannot fall over completely out of said airstream through said vent; and including
   (4) support means connected between said target parachute and the load to be carried by said combination, said support means being adapted to accommodate aerial pick-up and retrieval forces.

2. Apparatus in accordance with claim 1 wherein said target suspension lines are connected from the skirt of said target parachute directly to the periphery of said vent.

3. Apparatus in accordance with claim 1 wherein said target parachute has a number of suspension line connection points at the skirt thereof, and including a number of target suspension lines greater than the number of said connection points, with two of said target suspension lines being connected to at least some of said connection points, each of said target lines having the low end thereof connected to a different separate point of said annular parachute near the periphery of said vent.

4. Apparatus in accordance with claim 1 wherein $n$ target suspension line connection points are provided at the skirt of said target parachute and at said annular parachute near the periphery of said vent, and including $n$ pairs, only, of target suspension lines, each of said pairs being respectively connected from a common target skirt connection point to two spaced connection points on said annular parachute, whereby said target parachute is constrained to a more rigid position relative to said annular parachute.

5. Apparatus in accordance with claim 1 wherein said annular parachute includes cross-vent lines connected diametrically across said vent opening.

6. Apparatus in accordance with claim 1 including cross-vent lines connected diametrically across said vent opening, and wherein said target suspension lines are connected to respective ones of said cross-vent lines inwardly from the periphery of said vent.

7. Apparatus in accordance with claim 1 wherein said target parachute comprises a canopy and a plurality of radial canopy lines forming extensions of said target suspension lines, said line as a whole being strong enough to carry aerial retrieval forces of said load, and at least one normally horizontal load band positioned circumferentially of said canopy between the skirt and apex and interlaced with said radial lines, said load band being strong enough to carry said retrieval forces and being only weakly attached to said radial lines, the latter attachments designed to break before the load strength of each of said radial lines is reached.

8. Apparatus in accordance with claim 1 wherein said target suspension lines are of relatively light strength; said annular parachute comprises a main canopy and a plurality of relatively light main suspension lines connected from said main canopy down to a load attachment means; and wherein said support means comprises at least one continuous radial reinforcement member extending from said load attachment means along one of said main suspension lines to one of said target suspension lines, along said one target suspension line over the top of said target parachute, and similarly down the opposite side of said parachute assembly to said load attachment means.

9. Apparatus in accordance with claim 1 wherein said target suspension lines are of relatively light strength; said annular parachute comprises a main canopy, a plurality of cross-vent lines, and a plurality of main suspension lines, said main suspension lines as a whole being strong enough to carry aerial retrieval forces of said load; and wherein said support means comprises at least one continuous reinforcement member extending from a central load point at the center of said cross-vent lines radially outward along one of said cross-vent lines to one of said target suspension lines, up along said one target suspension line over the top of said target parachute, and similarly down the opposite side of said target parachute to said one cross-vent line and inward to said central load point.

References Cited

UNITED STATES PATENTS

| | | | |
|---|---|---|---|
| 2,120,177 | 6/1938 | Hart | 244—142 |
| 2,206,910 | 7/1940 | McCarroll | 244—142 |
| 2,523,276 | 9/1950 | Buhler | 244—142 |
| 2,784,927 | 3/1957 | Turolla | 244—152 |
| 3,049,322 | 8/1962 | Vlasic | 244—152 |
| 3,137,465 | 6/1964 | Mulcahy | 244—152 |

FOREIGN PATENTS

| | | |
|---|---|---|
| 525,566 | 1/1954 | Belgium. |
| 70,761 | 12/1942 | Czechoslovakia. |

MILTON BUCHLER, *Primary Examiner.*

FERGURS S. MIDDLETON, *Examiner.*

R. A. DORNON, *Assistant Examiner.*